(12) United States Patent
Hasagic (10) Patent No.: US 11,628,811 B2
(45) Date of Patent: *Apr. 18, 2023

(54) COMBINED REAR EXTERIOR LAMP AND CLEANING SYSTEM FOR CLEANING A REAR WINDOW OF A VEHICLE

(71) Applicant: Volvo Car Corporation, Gothenburg (SE)

(72) Inventor: Samir Hasagic, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 37 days.

This patent is subject to a terminal disclaimer.

(21) Appl. No.: 16/297,807

(22) Filed: Mar. 11, 2019

(65) Prior Publication Data

US 2019/0308590 A1    Oct. 10, 2019

(30) Foreign Application Priority Data

Apr. 10, 2018    (EP) .................................. 18166503

(51) Int. Cl.
*B60S 1/52* (2006.01)
*B60Q 1/30* (2006.01)
(Continued)

(52) U.S. Cl.
CPC .............. *B60S 1/52* (2013.01); *B60Q 1/0017* (2013.01); *B60Q 1/302* (2013.01); *B60S 1/58* (2013.01)

(58) Field of Classification Search
CPC . B60S 1/52; B60S 1/58; B60Q 1/0017; B60Q 1/302
See application file for complete search history.

(56) References Cited

U.S. PATENT DOCUMENTS 3,295,004 A    12/1966 Hirsch
3,915,385 A *  10/1975 Hassinger ................. B60S 1/52
                                                       239/284

(Continued)

FOREIGN PATENT DOCUMENTS

CN      106232437 A    12/2016
DE     102007033170 A1  1/2009
(Continued)

OTHER PUBLICATIONS

Sep. 17, 2018 European Search Report issue on International Application No. EP18166503.

(Continued)

*Primary Examiner* — Steven M Cernoch
(74) *Attorney, Agent, or Firm* — Clements Bernard Walker; Christopher L. Bernard (57) ABSTRACT

A combined rear exterior lamp and cleaning system including: a lens for the rear exterior lamp of the vehicle, the lens has an inner surface and an outer surface, a cleaning arrangement for providing a cleaning fluid to an exterior surface of the rear window, an inlet connectable to a cleaning fluid hose for providing cleaning fluid to the cleaning arrangement. The cleaning arrangement includes a channel generally parallel with at least one of the lens inner surface or the lens outer surface, and an array of outlets in fluid communication with the channel. The channel is attached to the lens and is adapted to transport the cleaning fluid from the inlet to the array of outlets located on the outer side of the lens for providing the cleaning fluid to the rear window.

13 Claims, 5 Drawing Sheets

(51) Int. Cl.
   *B60S 1/58*   (2006.01)
   *B60Q 1/00*   (2006.01)

(56) References Cited

U.S. PATENT DOCUMENTS

| | | | |
|---|---|---|---|
| 6,074,078 A | 6/2000 | Georgeff et al. | |
| 6,305,618 B1 * | 10/2001 | Lin | B60Q 1/2684 239/17 |
| 6,857,582 B1 * | 2/2005 | Wang | B60Q 1/0017 239/17 |

FOREIGN PATENT DOCUMENTS

| | | | |
|---|---|---|---|
| FR | 3011201 A1 | 4/2015 | |
| WO | WO-2007079799 A1 * | 7/2007 | B05B 1/04 |

OTHER PUBLICATIONS

Jun. 15, 2022 Office Action and Search report issued in the corresponding CN application No. 201910264806.4.

\* cited by examiner

COMBINED REAR EXTERIOR LAMP AND CLEANING SYSTEM FOR CLEANING A REAR WINDOW OF A VEHICLE

CROSS-REFERENCE TO RELATED APPLICATION

The present patent application/patent claims the benefit of priority of co-pending European Patent Application No. 18166503.5, filed on Apr. 10, 2018, and entitled "A COMBINED REAR EXTERIOR LAMP AND CLEANING SYSTEM FOR CLEANING A REAR WINDO OF A VEHICLE," the contents of which are incorporated in full by reference herein.

TECHNICAL FIELD

The present invention relates to a combined rear exterior lamp and cleaning system for cleaning a rear window of a vehicle. The present invention also relates to a vehicle including a combined rear exterior lamp and cleaning system.

BACKGROUND

Generally, a cleaning system for cleaning the rear window of a vehicle includes a nozzle for spraying a washer fluid to the window. The nozzle may for example be integrated in a spoiler or in the vehicle trunk door. The location of the nozzle thus requires holes through e.g. the trunk door or spoiler which increases the risk of fluid leakage into the vehicle.

U.S. Pat. No. 6,074,078 discloses one example of integrating the nozzle into a center high mount stop lamp of a vehicle. According to U.S. Pat. No. 6,074,078, a nozzle is integrated in the lens of the center high mount stop lamp. Thus, a hole is made in the lens through which the nozzle is mounted.

However, the nozzle location suggested by U.S. Pat. No. 6,074,078 still introduces a path for fluid to enter into the lamp through the hole in the lens.

Moreover, the nozzles provided in prior art are generally not efficient in spreading the washer fluid across the window. It would therefore also be desirable to improve the coverage of washer fluid provided for cleaning a rear window of a vehicle.

Accordingly, it appears that rear window cleaning systems for vehicles may be improved in several ways.

SUMMARY

In view of above, it is an object of the present invention to provide a combined rear exterior lamp and cleaning system for cleaning a rear window of a vehicle which alleviates at least one of the above mentioned problems in prior art.

According to a first aspect of the invention, there is provided a combined rear exterior lamp and cleaning system for cleaning a rear window of a vehicle, the system including: a lens for the rear exterior lamp of the vehicle, the lens having an inner surface and an outer surface, the inner surface is adapted to face a light source for the rear exterior lamp; a cleaning arrangement for providing a cleaning fluid to an exterior surface of the rear window, an inlet connectable to a cleaning fluid hose for providing cleaning fluid to the cleaning arrangement, the inlet is arranged on the same side of the lens as the inner surface, wherein the cleaning arrangement includes a channel and an array of outlets in fluid communication with the channel, the channel is attached to the lens and is adapted to transport the cleaning fluid from the inlet to the array of outlets, wherein the channel is generally parallel with at least one of the lens inner surface or the lens outer surface, wherein the outlets are located on the outer side of the lens on the same side as the outer surface of the lens, the outlets being adapted for providing the cleaning fluid to the rear window of the vehicle.

The present invention is based on the realization that the cleaning arrangement for cleaning of a rear window of a vehicle may be included of outlets in the lens of a rear exterior lamp, the outlets being in fluid communication with a channel running along the lens surface. Hereby, the spread of washing fluid to the rear window may be improved. In addition, since the cleaning arrangement is comprised of the channel and the outlets in the lens, the traditional nozzle may be omitted which eliminates the problems related with mounting of the nozzle for proper operation.

The channel may for example be integrated with the lens, or the channel may be attached to the lens as a separate part, or even attached on the outer surface of the lens. The location of the channel and its outlets may in this way provide for improved cleaning of the rear window.

Furthermore, the shape and location of the channel itself may be tailored depending on the design and shape of the window.

Accordingly, advantages with the invention include improved cleaning of the rear window, and eliminated need for a traditional nozzle.

The light source may be mountable in a light source holder arranged in the exterior lamp. The light source holder includes an arrangement for mechanically holding a light source in place in the headlamp and electrical circuitry for providing electrical power to the light source.

A light source may be for example a halogen light emitting device, a light-emitting diode (LED), or any other suitable light emitting device for vehicle exterior lights.

The inner surface of the lens and the outer surface of the lens may be opposite to each other meaning that the inner surface faces an inside compartment of the rear exterior lamp where the light source holder is located, and the outer surface faces the outside of the compartment, when the lens is arranged in a rear exterior lamp. The outer surface may at least locally face in an opposite direction compared to the inner surface.

The inlet for connecting a cleaning fluid hose to the cleaning arrangement is reachable from the inner side of the lens. Accordingly, when the lens is arranged in a rear exterior lamp, the cleaning fluid hose may be connected to the cleaning arrangement from inside the compartment accommodating the light source holder.

The cleaning arrangement is advantageously made from an optically transmissive material, such as the same material as the lens material. The material of the lens may include e.g. a plastic material. Materials for the lens are known per se in the art. The lens may be manufactured by e.g. injection molding techniques.

In one possible implementation of the inventive concept, the cleaning arrangement may be embedded in the lens material whereby the channel lies in the lens material and the outlets are formed in the lens material.

Accordingly, the channel and the outlets may be made in one piece with the lens and is in this way fully integrated in the lens. Thus, the cleaning arrangement is in-separable from the lens itself which facilitates mounting of the cleaning arrangement since the cleaning arrangement is already part of the lens itself and is therefore mounted in the rear exterior lamp at the same time as the lens.

In another possible implementation of the inventive concept, the lens may include a through-opening from the inner surface to the outer surface, wherein the cleaning arrangement is a releasably attached in the through-opening to seal the through-opening. Thus, the cleaning arrangement may be separable from the lens. However, in use, the cleaning arrangement is mounted in the through-opening with the outlets on the outer side of the lens, i.e. the same side as the outer surface. If needed, the cleaning arrangement may in this possible implementation be replaced or removed for maintenance without removing the lens. The cleaning arrangement may be attached in the through-opening using e.g. screws tightened to the lens material, or by a spring arrangement.

The channel may be arranged along one axis. Accordingly, the channel may be a relatively straight channel. Further the array of outlets may be arranged such that the outlets are distributed from a first end portion to a second end portion of the channel. In this way, improved coverage of washing fluid from the cleaning arrangement is possible.

In some embodiments, the outlets of the array of outlets are evenly spread along the channel.

In other embodiments, the spacing between outlets in a first subset of outlets may be different from the spacing between outlets in a second subset of outlets. For example, it may be advantageous to provide more cleaning fluid to portions of the rear window which are more important to clean than other portions. A central portion of the rear window may for example be of higher importance to be kept clean compared to distal side portions of the window, near the edges of the window. The central portions of the rear window may therefore be cleaned with higher priority with a higher density of outlets. As a further example, some surface portions of the rear window may be more prone to get dirty and may thus be in need of more cleaning fluid whereby a higher density of outlets may advantageously be used for cleaning such outer surface portions.

A longitudinal axis of the outlets from the channel may intercept with the rear window of the vehicle. Accordingly, the outlets may be arranged facing the rear window surface such that washing fluid from the outlets are spayed primarily onto the rear window. The longitudinal axis of the outlets is along the main direction of jet stream of washing fluid from the respective outlet.

The channel is generally parallel with at least one of the lens inner surface or the lens outer surface. Accordingly, the channel is arranged along the shape of at least one of the lens inner surface or the lens outer surface.

In order to provide a relatively large coverage of the outer surface of the window for the washing fluid, the length of the channel is at least about half the side-to-side distance of the outer surface of the lens. In possible embodiments, the channel is arranged from one side portion to another side portion of the lens.

In some embodiments, the channel may include at least two channel segments in fluid communication with each other, each channel segment having respective outlets, wherein an axis along one of the channel segments intercepts an axis along another one of the channel segments. The channel may thus include at least two segments that are arranged at an angle with respect to each other, the angle being such that the cleaning fluid flow changes direction at the interception between the segments. Hereby, it is advantageously possible to angle the outlets towards specifically targeted portions of the outer surface of the rear window, to thereby improve the coverage of cleaning fluid.

The cleaning system may include a hose and a cleaning fluid container, wherein the hose is connectable to the inlet for providing a cleaning fluid to the inlet from the cleaning fluid container arranged for holding a reservoir of cleaning fluid.

The rear exterior lamp may include a housing for accommodating the light source holder, wherein the lens is adapted to seal an opening in the housing. Thus, the lens is arranged such that light emitted by a light source arranged in the light source holder in the housing is transmitted through the lens.

The rear exterior lamp is preferably arranged above the rear window of the vehicle. The rear exterior lamp may for instance be a center high mount stop lamp.

According to a second aspect of the inventive concept, there is provided a vehicle including a combined rear exterior lamp and cleaning system.

This second aspect of the invention provides similar advantages as discussed above in relation to the previous aspect of the invention.

Further features of, and advantages with, the present invention will become apparent when studying the appended claims and the following description. The skilled person realizse that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DESCRIPTION OF EMBODIMENTS

In the present detailed description, various embodiments of inventive concept are mainly described with reference to a vehicle in the form of a car. However, the present invention may equally be used for any other type vehicle such as e.g. a bus, a truck, etc. This invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
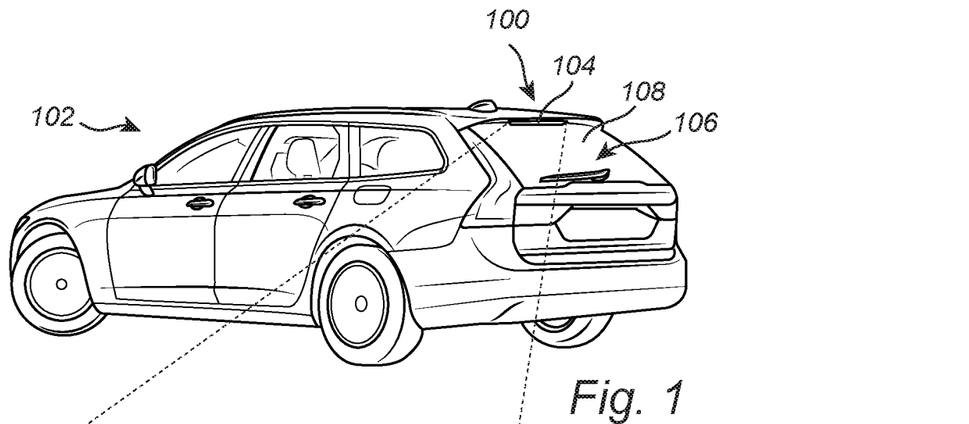
FIG. 1 schematically illustrates a vehicle including a combined rear exterior lamp and cleaning system.

FIG. 1 shows a vehicle in the form of a car 102. The car 102 includes a rear exterior lamp 104 arranged to provide illumination to the rear side of the car 102. The rear exterior lamp 104 is generally in communication with a vehicle electrical system such that an operator of the car 102 may control the lighting state of the rear exterior lamp 104. For example, such lighting state may be a brake light signal activated by a braking action by the operator of the car 102. The brake light signal provides an indication for drivers of vehicles or pedestrians behind the car 102 that a braking action has been initiated. In this exemplary embodiment, the rear exterior lamp 104 is arranged above the rear window 106 of the car 102. The rear exterior lamp 104 is shown as a center high mount stop lamp.

The rear exterior lamp 104 includes a lens (not numbered in FIG. 1, better seen in e.g. FIGS. 2A-B) having an outer surface facing outside of the rear exterior lamp 104. The lens includes a cleaning arrangement for providing a cleaning fluid to the rear window 106 of the car 102. The cleaning arrangement and the lens will be described further with reference to subsequence drawings.

The car 102 includes a cleaning fluid container (not shown) for holding cleaning fluid for the cleaning arrangement. Further, a cleaning fluid hose (not shown) is arranged to transfer the cleaning fluid from the cleaning fluid container to an inlet (not shown in FIG. 1, see e.g. FIG. 2B and FIG. 5) of the cleaning arrangement. The cleaning fluid is transferred from the cleaning fluid container to the cleaning fluid arrangement via the hose by e.g. pressurizing the cleaning fluid in the cleaning fluid container, or by any other means known in the art.

Figures 2A, 2B:
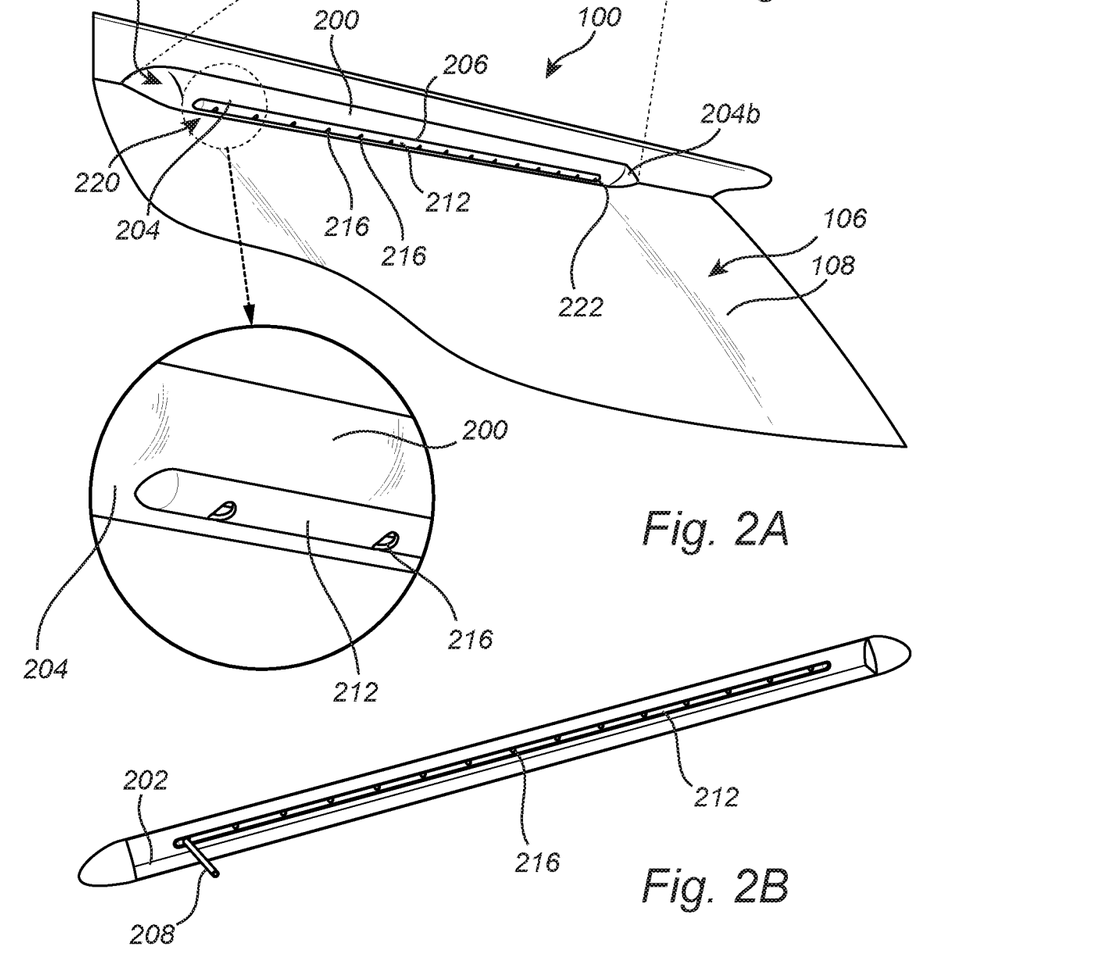
FIGS. 2A-B show conceptual views of example embodiments of the invention.

FIG. 2A conceptually illustrates a close-up view of the combined rear exterior lamp and cleaning system 100 according to embodiments of the inventive concept, and FIG. 2B illustrates the inner side of the lens 200 for the rear exterior lamp 104. FIG. 2A will now be described in conjunction with FIG. 2B.

The combined rear exterior lamp and cleaning system 100 includes the lens 200 which is adapted for the rear exterior lamp 104 of the vehicle 102. The lens 200 has an inner surface 202 (FIG. 2B) facing a light source (not shown) when mounted in the rear exterior lamp 104, and an outer surface 204 facing outside of the rear exterior lamp 104. At least locally, a normal axis to the inner surface 202 may face in a direction opposite a normal axis to the outer surface 204.

For cleaning of the rear window 106 of the car 102, the lens 200 includes a cleaning arrangement 206. The cleaning arrangement 206 is adapted for providing a cleaning fluid to an exterior surface 108 of the rear window 106. For this purpose, a channel 212 of the cleaning arrangement is integrated with the lens 200 in the presently described example embodiment. The channel 212 is in fluid communication with outlets 216 located on the outer side of the lens 200 on the same side as the outer surface 204 of the lens. Cleaning fluid may be transferred by the channel 212 to the outlets 216 for distributing the cleaning fluid to the exterior surface 108 of the rear window 106 of the car 102.

In the example embodiment illustrated in FIGS. 2A-B, the channel 212 and the outlets 216 are made in the same piece as the lens 200. In other words, the channel 212 runs through the material of the lens 200 and the outlets 216 are formed in the lens material. The cleaning arrangement 206 is in this way embedded and thus fully integrated with the lens 200. In this example embodiment shown in FIGS. 2A-B, the channel 212 is arranged along a generally horizontal axis, when mounted on a vehicle for use.

The cleaning fluid is provided to the cleaning arrangement 206 at an inlet 208. The inlet 208 is adapted to receive a cleaning fluid hose (not shown) which is configured to transfer the cleaning fluid to the cleaning arrangement 206 from a cleaning fluid container (not shown). The inlet 208 is located on the same side of the lens as the inner surface 202.

In other words, the inlet 208 is arranged facing the inside of a compartment of the rear exterior lamp 104. It is in the compartment that the light sources are mounted when the rear exterior lamp 104 is in place for use in a vehicle.

The channel 212 is generally parallel with at least one of the inner surface 202 or the outer surface 204. In other words, the channel is configured to transport cleaning fluid in a direction generally parallel with the outer surface 204 or the inner surface 202, or even in a direction generally parallel with the outer surface 204 and the inner surface 202, or at least parallel with local regions of the outer surface 204 and/or the inner surface 202.

The channel 212 may be arranged in a direction generally parallel with a side-to-side direction of the outer surface 204 of the lens 200. The side-to-side direction is from a first side 204a to a second side 204b of the lens outer surface 204.

The array of outlets 216 are distributed from a first end portion 220 of the channel 212, to a second end portion 222 of the channel 212. The outlets 216 may be evenly spread along the channel 212, i.e. spaced apart from each other at the same distance across the array of outlets 216.

Figure 3:
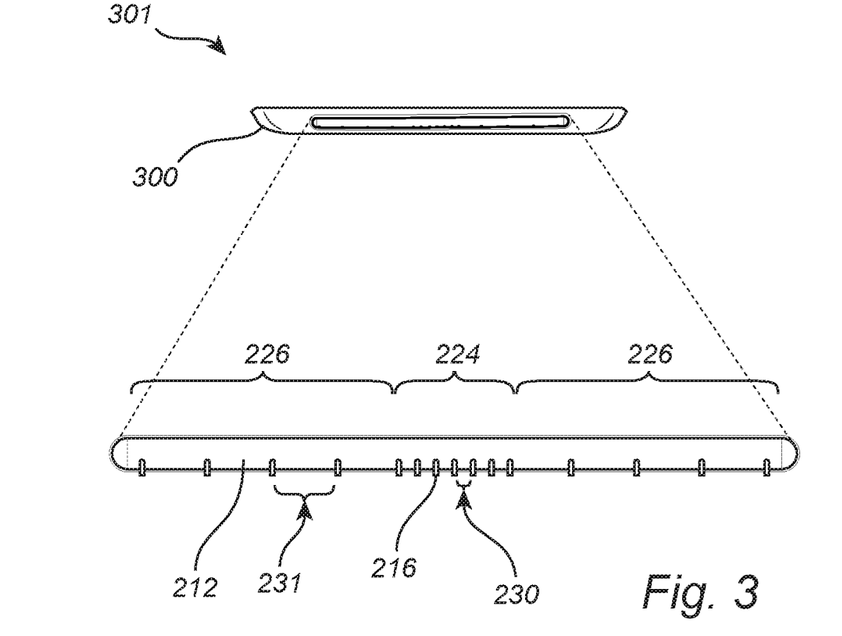
FIG. 3 is a conceptual view of an example embodiment of the invention.

However, in further possible implementations the spacing between outlets 216 may vary across the array of outlets 216, as illustrated in FIG. 3. For example, there may be portions of the outer surface of the rear window 106 that requires higher priority cleaning than other surface portions. The outlets arranged to provide cleaning fluid to the higher priority portions may be more closely spaced apart.

In the example embodiment illustrated in FIG. 3, the spacing 230 between the outlets 216 (only one is numbered) in a subset 224 of outlets 216 is smaller than the spacing 231 between outlets 216 in another subset 226 of outlets. The outlets in the subset 224 with the smaller inter-spacing are arranged closer to the center of the channel 212 which in this example embodiment is closer to the center of the lens 300 of the combined rear exterior lamp and cleaning system 301. The surface portion of the rear window 106 exterior surface 108 located near the center of the channel 212 may thus be in more need of cleaning than other portions of the rear window 106 exterior surface 108. For instance, the center portion of the rear window may be higher prioritized with regards to maintaining the window clean for sufficient visibility for the driver.

Figure 4A:
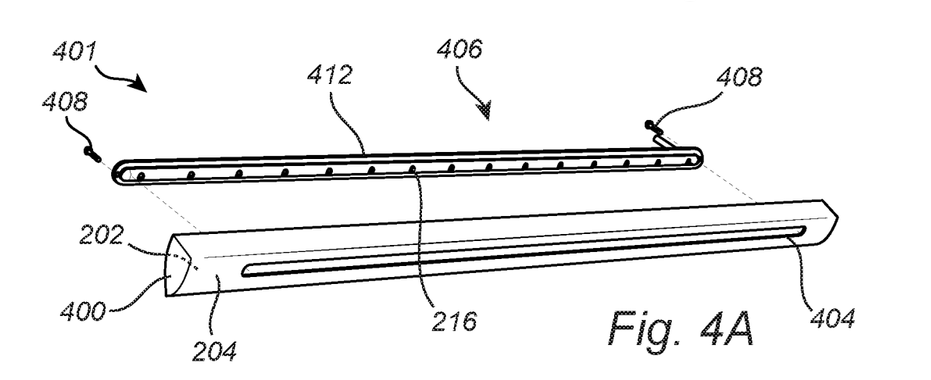
FIGS. 4A-B show conceptual views of example embodiments of the invention.
Figure 4B:
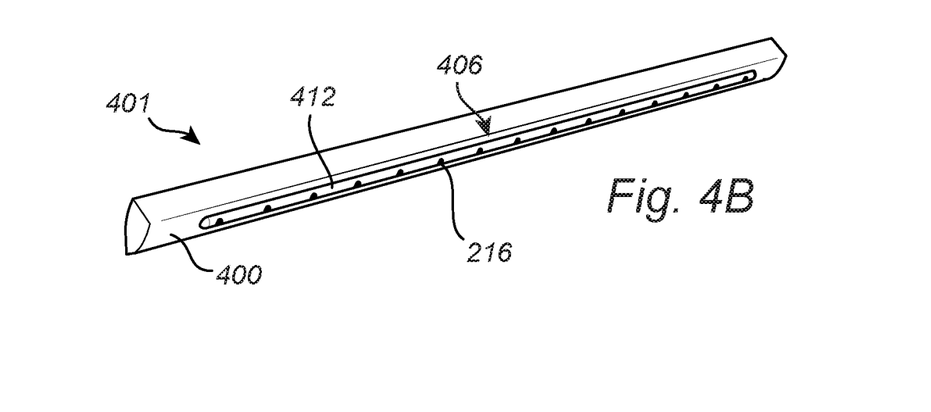

FIGS. 4A-B schematically illustrate two views of a further embodiment in accordance with the inventive concept. In FIGS. 4A-B, there is shown a lens 400 for the rear exterior lamp 104 of a combined rear exterior lamp and cleaning system 401 for a vehicle. The lens 400 has a through-opening 404 through the lens 400. The through-opening 404 is between the inner surface 202 to the outer surface 204 of the lens 400. Features in FIGS. 4A-B with reference numerals that are the same as in FIGS. 2 and 3 will not be described again, instead refer to the description of FIGS. 2A-B and FIG. 3.

The cleaning arrangement 406 shown in FIGS. 4A-B includes a channel 412 and the array of outlets 216 as described with reference to FIGS. 2A-B and 3. However, in the example embodiment of FIGS. 4A-B, the cleaning arrangement 406 is provided as a separate part and is releasably attached to the lens 400 in the through-opening 404. The cleaning arrangement 406 is here shown to be attached to the lens 400 by means of screws 408; however, other means of attachment such as springs or bayonet mount are possible and within the scope of the invention. In FIG. 4B, the cleaning arrangement 216 is shown mounted in the through-hole 404 in the lens 400.

In FIGS. 2A-B, 3, and 4A-B, the channel 212, 412 of the cleaning arrangement 206, 406 is illustrated as a single straight segment. However, the channel may in other possible implementations include more than one segment having the array of outlets 216 arranged in each of the segments.

Figure 5:
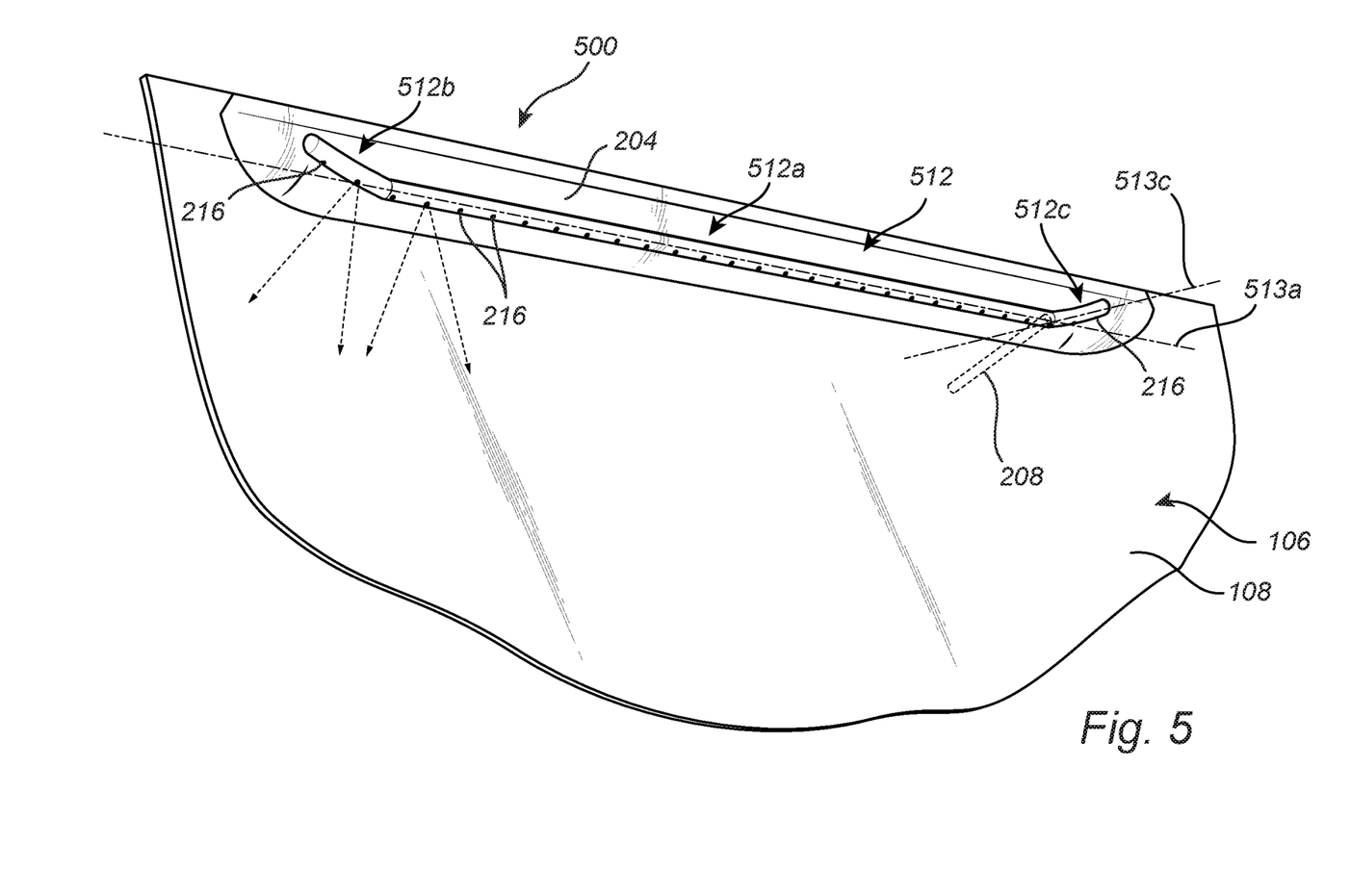
FIG. 5 is a conceptual view of an example embodiment of the invention.

FIG. 5 illustrates a lens 500 for a rear exterior lamp of a vehicle including a channel 512 having three segments 512a, 512b, and 512c. The segments 512a-c are in fluid communication with each other. Thus, cleaning fluid provided to the inlet 208 is transported by the segment 512c to the segment 512a and 512b. The cleaning fluid is distributed by the outlets 216 in each of the segments 512a-c to the outer surface 204 of the rear window 106. Further, the segments are arranged at an angle with respect to each other; in other words, an axis 513a along one of the channel segments 512a intercepts an axis 513c along another one 512c of the channel segments.

Figure 6:
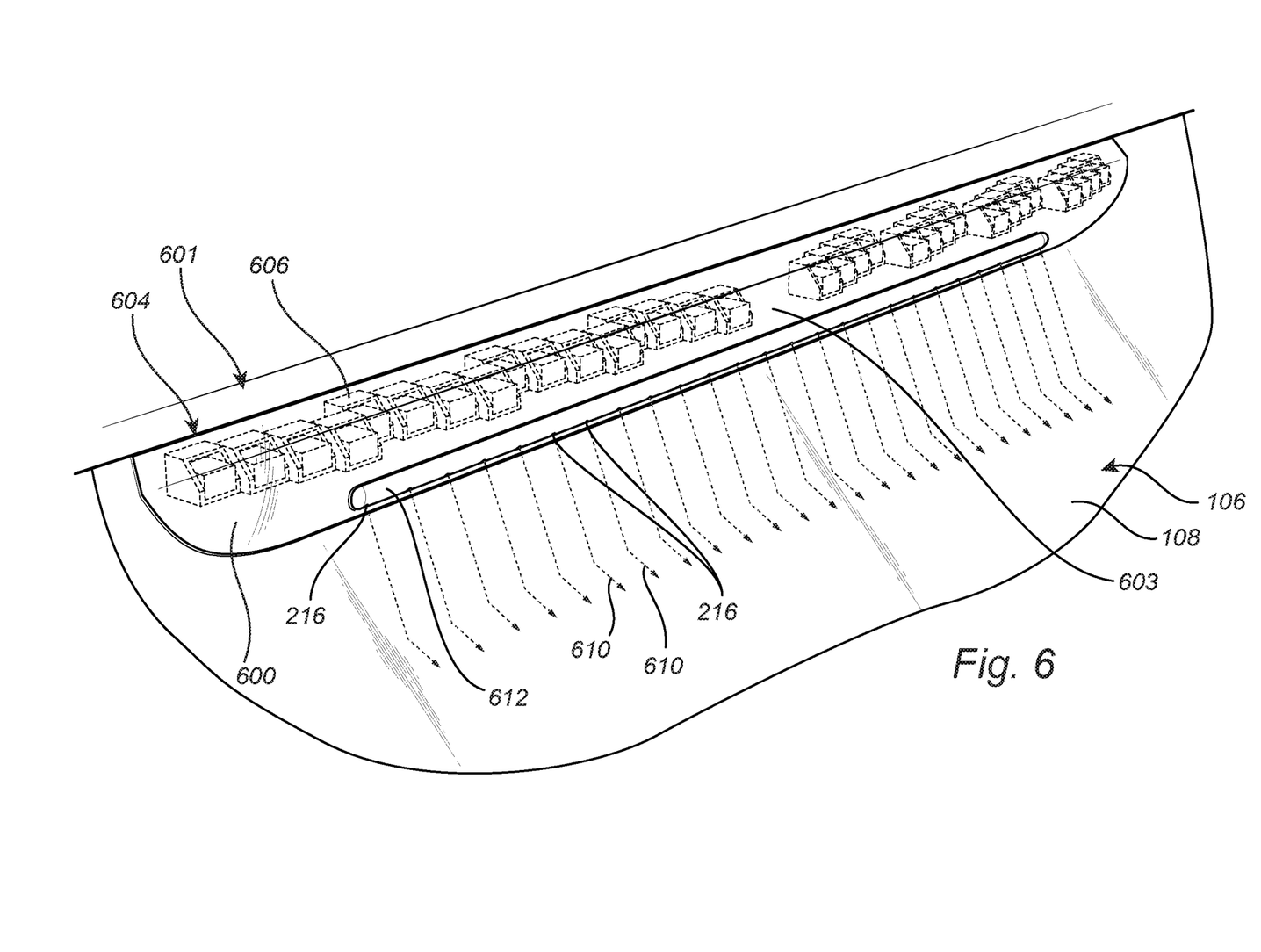
FIG. 6 is a conceptual view of an example embodiment of the invention.

FIG. 6 conceptually illustrates combined rear exterior lamp and cleaning system 600 which may include a lens according to any one of the described embodiments. However, here in this example embodiment, the lens 600 is conceptually illustrated as the lens 200 or 400 for example purposes.

The combined rear exterior lamp and cleaning system 601 includes a housing 604 accommodating a light source holder 606. An inner surface of the lens 600 faces the light source holder 606. The lens 600 further has an outer surface 603. A hose (not shown) inside the combined rear exterior lamp and cleaning system 600 provides a cleaning fluid to the cleaning arrangement of the lens 600 from a cleaning fluid container (not shown). Jets 610 of cleaning fluid are shown in FIG. 6 for illustrative purposes.

The cleaning fluid may be pressurized and is thus forced through the cleaning fluid hose to the cleaning arrangement channel 612. The cleaning fluid is thereby sprayed out from the outlets 216 (not all are numbered) as jets 610 of cleaning fluid for distributing the cleaning fluid on the exterior surface 108 of the rear window 106 of a vehicle.

Figure 7:
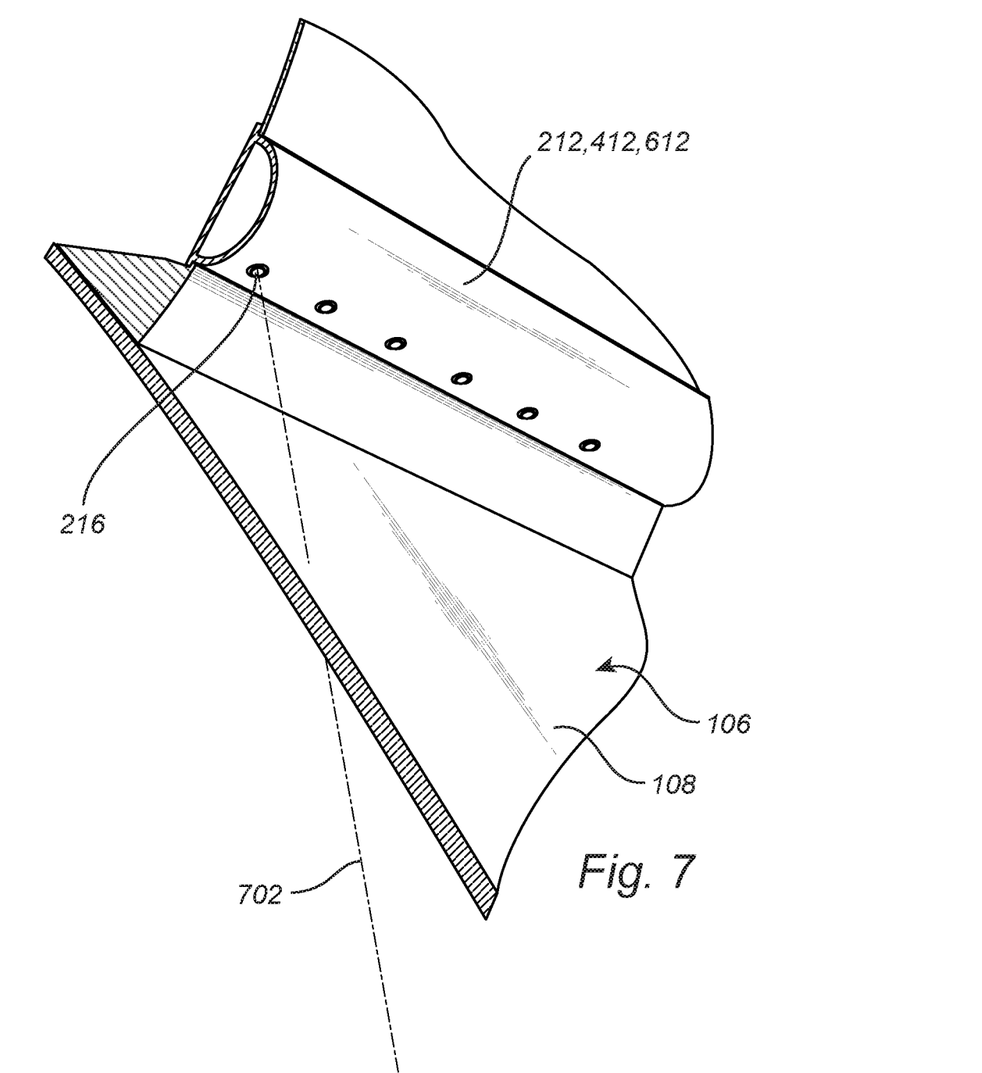
FIG. 7 illustrates a configuration of the outlets with respect to the rear window of a vehicle.

In order for the cleaning fluid to more easily be distributed on the exterior surface 108 of the rear window, it is advantageous for the outlets to be pointing towards the exterior surface 108 of the rear window 106, as is conceptually illustrated in FIG. 7. Thus, a longitudinal axis 702 of the outlets 216 from the channel 212 intercepts with the rear window 106 of the vehicle, such that a jet of cleaning fluid from the outlets 216 are directed towards the rear window 106.

The material of the lens may include e.g. a plastic material. Materials for the lens are known per se in the art.

The material of the housing may include e.g. plastic or metallic materials, known per se in the art.

The person skilled in the art realizes that the present invention by no means is limited to the preferred embodiments described above. On the contrary, many modifications and variations are possible within the scope of the appended claims. For example, the lens may include several (i.e. more than one) channels having associated inlets and outlets.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A combined rear exterior lamp and cleaning system for cleaning a rear window of a vehicle, the combined rear exterior lamp and cleaning system comprising:
 a lens for the rear exterior lamp of the vehicle, the lens extending in a side-to-side direction of the vehicle and having an inner surface and an outer surface, the inner surface adapted to face a light source for the rear lamp,
 a cleaning arrangement for providing a cleaning fluid to an exterior surface of the rear window,
 an inlet connectable to a cleaning fluid hose for providing cleaning fluid to the cleaning arrangement, the inlet arranged on the same side of the lens as the inner surface,
 wherein the cleaning arrangement comprises a channel member defining a channel that is disposed in a through-opening through the lens that runs parallel to both the inner surface and the outer surface of the lens and extends in a side-to-side direction of the lens that corresponds to the side-to-side direction of the vehicle and an array of outlets in fluid communication with the channel of the channel member and extending at an angle from the channel to the outer surface of the lens, wherein the channel runs between adjacent outlets of the array of outlets from a first side of the lens to a second side of the lens, and wherein the channel is embedded in and the array of outlets are formed through a material of the channel member and are adapted to transport the cleaning fluid from the inlet, along the outer surface of the lens in the side-to-side direction of the lens, to each of the array of outlets from the first side of the lens to the second side of the lens, and to the rear window of the vehicle through the outer surface of the lens, and the channel member and the lens formed with a same material.

2. The combined rear exterior lamp and cleaning system according to claim 1, wherein the lens comprises the through-opening from the inner surface to the outer surface, wherein the cleaning arrangement is releasably attached in the through-opening to seal the through-opening.

3. The combined rear exterior lamp and cleaning system according to claim 1, wherein the array of outlets is distributed from a first end portion to a second end portion of the channel.

4. The combined rear exterior lamp and cleaning system according to claim 1, wherein the outlets of the array of outlets are evenly spread along the channel.

5. The combined rear exterior lamp and cleaning system according to claim 1, wherein the spacing between outlets in a first subset of outlets is different from the spacing between outlets in a second subset of outlets.

6. The combined rear exterior lamp and cleaning system according to claim 1, wherein a longitudinal axis of the outlets from the channel intercepts with the rear window of the vehicle.

7. The combined rear exterior lamp and cleaning system according to claim 1, wherein the length of the channel is at least half the side-to-side distance of the outer surface of the lens.

8. The combined rear exterior lamp and cleaning system according to claim 1, wherein the channel comprises at least two segments in fluid communication with each other, each segment having respective outlets, wherein an axis along one of the channel segments intercepts an axis along another one of the channel segments.

9. The combined rear exterior lamp and cleaning system according to claim 1, wherein the rear exterior lamp comprises a housing for accommodating a light source holder for the light source, wherein the lens is adapted to seal an opening in the housing.

10. The combined rear exterior lamp and cleaning system according to claim 1, comprising a hose and a cleaning fluid container, wherein the hose is connectable to the inlet for providing a cleaning fluid to the inlet from the cleaning fluid container arranged for holding a reservoir of cleaning fluid.

11. The combined rear exterior lamp and cleaning system according to claim 1, wherein the rear exterior lamp is arranged above the rear window.

12. The combined rear exterior lamp and cleaning system according to claim 1, wherein the rear exterior lamp is a center high mount stop lamp.

13. A vehicle, comprising:
- a rear window; and
- a combined rear exterior lamp and cleaning system for cleaning the rear window of the vehicle, the combined rear exterior lamp and cleaning system comprising:
  - a lens for the rear exterior lamp of the vehicle, the lens extending in a side-to-side direction of the vehicle and having an inner surface and an outer surface, the inner surface adapted to face a light source for the rear lamp,
  - a cleaning arrangement for providing a cleaning fluid to an exterior surface of the rear window,
  - an inlet connectable to a cleaning fluid hose for providing cleaning fluid to the cleaning arrangement, the inlet arranged on the same side of the lens as the inner surface, wherein the cleaning arrangement comprises a channel member defining a channel that is disposed in a through-opening through the lens that runs parallel to both the inner surface and the outer surface of the lens and extends in a side-to-side direction of the lens that corresponds to the side-to-side direction of the vehicle and an array of outlets in fluid communication with the channel of the channel member and extending at an angle from the channel to the outer surface of the lens, wherein the channel runs between adjacent outlets of the array of outlets from a first side of the lens to a second side of the lens, and wherein the channel is embedded in and the array of outlets are formed through a material of the channel member and are adapted to transport the cleaning fluid from the inlet, along the outer surface of the lens in the side-to-side direction of the lens, to each of the array of outlets from the first side of the lens to the second side of the lens, and to the rear window of the vehicle through the outer surface of the lens, and the channel member and the lens formed with a same material.

\* \* \* \* \*